J. B. ROOT.

Steam Boiler.

No. 4,082.

Reissued July 26, 1870.

Witnesses:
Geo. P. Hayes
R. R. Rabaum

John B. Root

N. PETERS, Photo-Lithographer, Washington, D. C.

United States Patent Office.

JOHN B. ROOT, FOR HIMSELF, AND THOMAS C. M. PATON, ASSIGNEE OF JOHN B. ROOT, OF NEW YORK, N. Y.

*Letters Patent No.* 74,146, *dated February* 4, 1868; *reissue No.* 4,082, *dated July* 26, 1870.

DIVISION A.

IMPROVEMENT IN STEAM-GENERATORS.

The Schedule referred to in these Letters Patent and making part of the same.

*To all whom it may concern:*

Be it known that I, JOHN B. ROOT, of the city, county, and State of New York, have invented certain new and useful Improvements in Steam-Boilers; and I do hereby declare that the following is a full, clear, and exact description of the same, reference being had to the accompanying drawing.

In what are called water-tube steam-boilers, that is to say, steam-boilers, the water-spaces of which consist of horizontal or inclined tubes, and in which the upper tube or tubes furthest from the fire, or the upper portions of some of them, may constitute steam-spaces, some better provision than has heretofore been made is necessary for obtaining dry steam, by separating from the steam the water that is carried up by or with it to the steam-room or steam-drum.

It is to make such provisions that is the principal object of this invention, and, with this end in view, The invention consists in a system of connections between the ends of the tubes, with the corresponding ends of those above and below, or those nearer to and further from the fire, whereby there is formed a series of chambers, with contracted and preferably tortuous communications, which constitute the steam up-take of the boiler, and whereby the steam and the water carried up with it, in passing through the said chambers and communications, from one tube to another above it, are met by opposing surfaces, and caused to separate, by the retardation of the currents or passage of the water, and the water is permitted to return, while the steam passes onward to the upper tubes.

Figure 1:
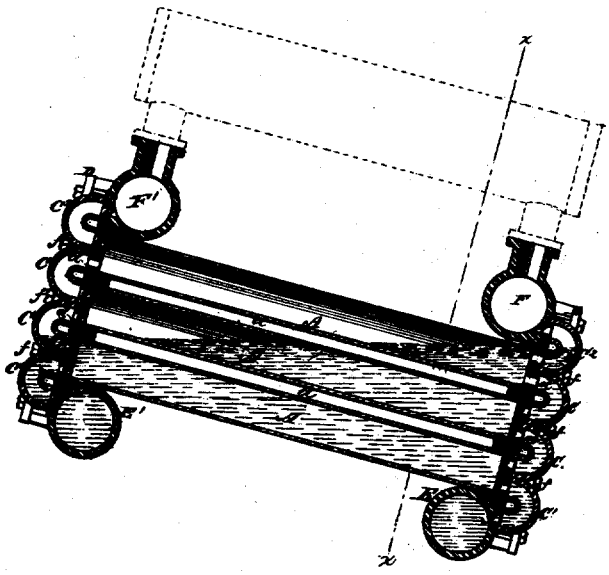
Figure 3:
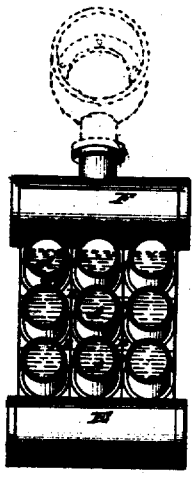
Figure 2:
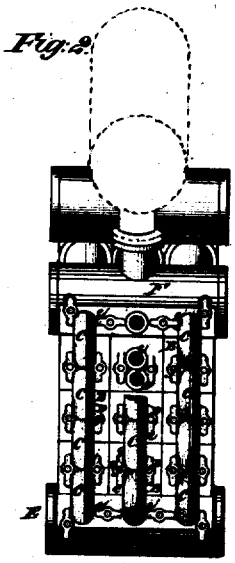

Figure 1, in the drawing, represents a longitudinal vertical section of a boiler;

Figure 2, an end view thereof, with a portion of one of the connections removed; and Figure 3, a transverse section of the same through the line *x x*, shown in fig. 1.

Similar letters of reference indicate corresponding parts in the several figures.

The boiler consists in a number of separate tubes containing the water to be heated, and which are arranged in tiers, one above the other, over the fire-place or furnace, the fire playing outside of the tubes, such tubes being connected with each other at each end, by means of return-pipes or bends communicating with apertures, one above the other, in the heads of the tubes, and connecting each tube with the one above and below it, whereby a circulation is kept up, foaming prevented, and the steam kept drier.

The ends of the boiler are constructed of a series of plates or separate heads, of square, or parallelogramic, or other form, a separate plate or head being fitted to each end of each main tube, and serving, by means of apertures therein, into which the return-pipes or bends are fitted and secured, to connect the main or water-tubes with each other.

Such water-tubes are also placed in an inclined position to the horizon, such that the water-line of the boiler may cross such tubes, so that they may form, not only the water-space of the boiler, but that portions of the internal spaces of such tubes, or of some of them, may also constitute the chambers, which are one of the elements of my invention, and between which the return-pipes or bends form the contracted and tortuous communications.

With the main water-tubes there may be also cross water-pipes connected therewith by means of return-pipes or bends, as aforesaid, and arranged to communicate with said tubes, or certain of them, at their ends, without breaking the continuity of the tubes.

A A represent tubes, made of wrought iron or other suitable metal, of any proper length, diameter, or thickness of metal, and of any desired number, arranged to lie one above another, and of which there may be several series, lying side by side, with flue or air-spaces between them or around each of such tubes.

Such tubes are placed in an inclined position to the horizon, as shown in fig. 1, sloping upwardly from the rear toward and over the fire-place, by which arrangement the water-line of the boiler may cross the several tubes and a portion of the internal space of such tubes, or of the upper series or ties of tubes above the water-line, and thus constitutes a steam-chamber.

Each and every one of such tubes A A are secured or fitted, at their opposite ends, with independent plates or blocks B B, of square, or parallelogramic, or other form, which form the heads of such tubes, and which, when combined and in their places, constitute the ends or general heads of the boiler, and through which the connections and communications of the tubes A A with each other, in each vertical series, are established, by means of the return-pipes, bends, or chambers, hereafter described.

If preferred, the tubes A A may be of cast-metal, with the plates or heads B B cast thereon.

To make or effect the connection and communication between the tubes A A, each plate or head B B is provided or constructed with apertures *b b*, the one lying above the other, and around each of such apertures is made an annular socket, *c*, within which may be inserted an India-rubber ring, *d*, or other packing, and into these sockets the ends of the return-pipes or bends *c c* are fitted, said return-pipes or bends connecting the upper aperture *b*, at each end of the one tube A, with the lower aperture *b*, at the same end of of the next tube A, above, and being secured or held to their places by clamping-bars D D, lapping over or on lugs or projections *e e*, and fastened by nuts and stud-bolts *f*, connected with the plates or heads B B, such clamping-bars being preferably so constructed and arranged as that any one bar serves to bear on or hold two of the return-pipes or bends C C.

In fig. 2, one of the return-pipes or bends is omitted, and another represented as broken, to expose the apertures *b b* and sockets *c c* to view.

Cross-pipes E E′ F F′ are or may be arranged above and below the tubes A A at opposite ends, which cross-pipes should be connected with the upper and lower rows of the tubes A A, by or through bends or pipes $C^1$ $C^2$, connecting the nearest of the apertures *b* of said tubes with apertures *g*, in a similar socketed manner to that used in establishing the connection of the return-pipes or bends C C, and being similarly held or secured by clamping-bars and stud-bolts connected with the cross-pipes, such clamping-bars being arranged to lie at right angles to those previously described, so that all the clamps or clamping-bars may be alike, as also all the plates, or blocks, or heads B B, and return-pipes or bends C C and $C^1$ $C^2$, and likewise main-pipes or tubes A A.

By such similarity or duplication of parts, there is secured, not only economy of construction, but increased facility is provided for fitting, changing, or renewing of parts, and extending or diminishing, by increasing or lessening the number of tubes, the capacity of the boiler, at pleasure.

By this construction, also, it will readily be perceived that any of the tubes A A may be removed without disturbing the others.

The return-pipes or bends, being of much smaller caliber than the tubes A A, may be made light, and will be strong enough, when of cast-iron, to prevent them bursting in advance of or sooner than the tubes A A, while the tubes A A, not being connected either with each other or the cross-pipes, excepting through the end plates or heads B B, are not cut away or weakened.

If desired, the lower arms or legs of the return-pipes or bends may be made longer than the upper ones, so as to admit, in an inclined position of the boiler, as represented, of the ends of the tubes A A and their plates or heads B B, lying in a vertical plane.

In some cases the upper E′ of the lower cross-pipes may be dispensed with, the same serving mainly as a bearer; also, where a steam-drum (shown in dotted outlines) is not used, or under other circumstances the lower one, F, of the upper cross-pipes may likewise be omitted, leaving the upper one, F′, of such pipes to answer as a steam-chest or drum, and, indeed, both such upper cross-pipes F F′, and the steam-drum may be omitted, as the upper ends of the upper rows of the main or water-tubes A A may, from their inclined position, constitute of themselves a steam-chest or drum.

The boiler generally, at least at its sides, may be set in brick-work or other setting, but its ends, if desired, be covered with sheet-iron or other jackets, to prevent loss, by radiation from said ends and the return-pipes or bends.

From this description it will be seen that the system here shown of return-pipes or bends, which form contracted and tortuous communications between the chambers formed by the tubes A A, as well as between the heads B B, and the consequence of this is, that the water which is carried up by and with the steam, in passing through said chambers and contracted and tortuous communications, which constitute the steam up-take, has its momentum so reduced, as water always has in passing through chambered passages, or passages of alternately larger and smaller area, or through tortuous passages, that a violent upward current of water is prevented, and it separates from the steam, and falls, by gravitation, and so returns to the lower portion of the tubes.

The upward current of water is also obstructed and checked by its striking against the heads B B of the tubes, which present surfaces directly opposed to the current, and thus caused to fall.

It will be observed that not only are such opposing surfaces presented by the inner surfaces of the heads B B, but by portions of the outer surfaces which surround the apertures *b b*, such apertures being smaller than the interiors of the return-pipes or bends.

The water, being thus thrown back, the steam reaches the upper portions of the boiler or tubes comparatively dry, and hence it will be generally, except where for any reason it may be necessary to keep a large volume of steam always in reserve, practicable to dispense with the large steam-drum or reservoirs, and to construct the whole steam-space of the boiler of tubes, thereby making it stronger and less liable to explode, but preserving uniformity of parts throughout.

In cases where it may be thought best to use a large steam-drum or reservoir, and to carry the water-line entirely to the top of the tubes, using no part of them for steam-room, the effect of the tortuous communications and opposing surfaces of the chamber-passages will be the same, viz., that of preventing the water from being projected with great force or in large quantities into the steam-drum.

This system of chambers and contracted and tortuous communications not only provides for obtaining dry steam, as described, but also provides for a perfect circulation of water in the lower part of the boiler, and for the free escape, through the water, of the steam, as fast as it is generated, in contact with the heated surfaces of the tubes, and also diminishes the tendency of the water to be carried up with the steam.

I am aware that water-tube boilers have been constructed with a contracted outlet from the tubes into the steam up-take. I, therefore, do not lay claim to the contracted outlet from the tubes into a general up-take for all the tubes, or a part thereof; but

What I claim as my invention, and desire to secure by Letters Patent, is—

1. The construction of the steam up-take of a water-tube boiler of a series of chambers and contracted communications, whereby the passage of the water with the steam from the lower to the upper tubes is retarded, substantially as herein described.

2. The connection of the tubes of a water-tube boiler, at their corresponding ends, by a system of connections, whereby opposing surfaces are presented to the upward current of water and steam, for the purpose of obstructing the passage of the water, substantially as herein described.

3. The connection of the corresponding ends of the tubes, by means of tortuous communications, whereby the steam and water passing through said communications are caused to make a tortuous circuit, in their upward course from one tube to another, without passing longitudinally through the tubes, substantially as herein described.

4. The combination with the water-tubes A A of the return-pipes or bends C C, connecting each tube at each end with one above and one below it, substantially as herein described.

JOHN B. ROOT.

Witnesses;

HENRY T. BROWN,

FRED. HAYNES.